United States Patent
Gu

(10) Patent No.: US 9,200,612 B2
(45) Date of Patent: Dec. 1, 2015

(54) DIRECT-CONNECTED LOW-SPEED SMALL MIXED FLOW TYPE WATER TURBINE APPLIED IN HYDRODYNAMIC ENERGY-SAVING COOLING TOWER

(75) Inventor: Xingkang Gu, Jiangsu (CN)

(73) Assignee: NANJING XINGFEI COOLING EQUIPMENT CO., LTD., Nanjing, Jiangsu (CN)

( * ) Notice: Subject to any disclaimer, the term of this patent is extended or adjusted under 35 U.S.C. 154(b) by 1038 days.

(21) Appl. No.: 13/322,554

(22) PCT Filed: Apr. 1, 2010

(86) PCT No.: PCT/CN2010/071503
§ 371 (c)(1),
(2), (4) Date: Jan. 22, 2012

(87) PCT Pub. No.: WO2010/135932
PCT Pub. Date: Dec. 2, 2010

(65) Prior Publication Data
US 2012/0114471 A1    May 10, 2012

(30) Foreign Application Priority Data

May 27, 2009 (CN) .......................... 2009 1 0027310

(51) Int. Cl.
*F03B 13/00*    (2006.01)
*F03B 3/02*    (2006.01)

(52) U.S. Cl.
CPC . *F03B 3/02* (2013.01); *F03B 13/00* (2013.01); *Y02E 10/223* (2013.01); *Y02E 10/28* (2013.01)

(58) Field of Classification Search
None
See application file for complete search history.

(56) References Cited

FOREIGN PATENT DOCUMENTS

WO PCT/CN2010/071503    7/2010

*Primary Examiner* — Nathaniel Wiehe
*Assistant Examiner* — Jeffrey A Brownson
(74) *Attorney, Agent, or Firm* — Global IP Services; Tianhua Gu

(57) ABSTRACT

The invention relates to a direct-connected low-speed small mixed flow type water turbine applied in a hydrodynamic energy-saving cooling tower, which comprises a water inlet scroll case (1), a seat ring (2) provided with single column of guide vanes annularly, a runner (12), a straight tapered water outlet pipe (9) and a side water outlet box (10), wherein the seat ring (2) is mounted on the inner side of the scroll case (1), a water outlet among the guide vanes in the seat ring (2) is communicated with a water inlet formed among curved surface blades (4), the water outlet formed among the curved surface blades (4) is communicated with the water inlet of the straight tapered water outlet pipe (9), the water outlet of the straight tapered water outlet pipe (9) is communicated with the water inlet of the side water outlet box (10), and the direct-connected low-speed small mixed flow type water turbine is characterized in that a bearing seat (6) is mounted on the runner (12), a shaft (7) is mounted in the bearing seat (6), and blades of a cooling fan are directly mounted on the shaft (7); and the value of unit rotational speed $$n_{11} = \frac{nD_1}{\sqrt{H}}$$

is 28-42, in the formula, n is the rated rotational speed of the blades of the cooling fan, D1 is the diameter of the water inlet of the runner (12), and H is the inlet water pressure. The invention has the advantages of small size, high efficiency and low noise.

7 Claims, 3 Drawing Sheets

DIRECT-CONNECTED LOW-SPEED SMALL MIXED FLOW TYPE WATER TURBINE APPLIED IN HYDRODYNAMIC ENERGY-SAVING COOLING TOWER

CROSS REFERENCE TO RELATED PATENT APPLICATION

The present application is the US national stage of PCT/CN2010/071503 filed on Apr. 1, 2010, which claims the priority of the Chinese patent application No. 200910027310.1 filed on May 27, 2009, which application is incorporated herein by reference.

TECHNICAL FIELD

The invention relates to a cooling tower, in particular to a water turbine for driving a cooling fan of the cooling tower, more specifically, the invention discloses a direct-connected low-speed small mixed flow type water turbine applied in a hydrodynamic energy-saving cooling tower, which is not equipped with a speed reduction box and can enable the output rotational speed of the water turbine to be the rated value of the rotational speed of the fan and further eliminate the speed reduction box used by a traditional reaction water turbine through reasonable design of sizes of all parts, in particular to key parameters of a water inlet seat ring and a runner.

BACKGROUND OF THE INVENTION

As we all know, an air-conditioning cooling tower, in particular to an industrial air-conditioning cooling tower, retains sufficiently abundant energy for cooling circulating water during the design, in order to realize the energy-saving purpose, a water turbine is used for recovering the part of the abundant energy and transforming the abundant energy to rotation mechanical energy of the water turbine for driving a cooling fan, thereby eliminating a traditional high-power cooling motor and realizing very significant energy-saving effect.

Presently, a circulating water abundant water head of the industrial air-conditioning cooling tower in China is 4 m-15 m, and the pressure water head of 0.5 m-1 m is required in the position for distributing water pipes, so that the water turbine for recovering the part of the circulating water abundant water head works in an environment with back pressure; but the rotational speed of the fan of the cooing tower is lower, in order to realize direct connection with the fan of the cooling tower, the low-speed mixed flow type water turbine must be selected; however, in the current spectrum of the water turbines in China, the low-speed mixed flow type water turbine which can meet the working environment and be directly connected with the cooling fan is still absent, the driving mode of connecting the ordinary mixed flow type water turbine with the fan of the cooling tower through a speed reducer needs to be adopted, as the working conditions of a speed reduction box are poorer, not only the noise is great and the service life is short, but also the manufacturing cost is correspondingly improved. Therefore, the mixed flow type water turbine which can meet the low unit rotational speed under the working environment and be directly connected with the fan of the cooling tower is developed, thereby having great practical significance.

An applicant thinks that the output rotational speed of the water turbine can be controlled within the desired range by reasonably designing sizes of all parts of the water turbine through a lot of calculation, analysis and experiments.

SUMMARY OF THE INVENTION

The invention aims at designing a direct-connected low-speed small mixed flow type water turbine which has high efficiency and small size, and can be widely applied in hydrodynamic energy-saving cooling towers against the problems of large noise, high failure rate and high manufacturing and maintenance cost of a water turbine with a speed reduction box, thereby enabling the water turbine for the cooling tower to bid farewell to the gear speed reduction box.

The technical scheme of the invention is as follows:

A direct-connected low-speed small mixed flow type water turbine applied in a hydrodynamic energy-saving cooling tower comprises:

A water inlet scroll case;

A seat ring 2 provided with single column of guide vanes annularly;

A runner 12 of the low-rotational speed mixed flow type water turbine, which comprises a lower ring 3, curved surface blades 4 and an upper crown 5;

A straight tapered water outlet pipe 9 and a side water outlet box 10;

The seat ring 2 is mounted on the inner side of the scroll case 1, a water inlet among the guide vanes in the seat ring 2 is communicated with a water outlet channel of the scroll case 1, the water inlet of the scroll case 1 is communicated with a water outlet of a circulating water pipe of the cooling tower, the water outlet among the guide vanes in the seat ring 2 is communicated with the water inlet formed among the curved surface blades 4 in the middle of the runner, the water outlet formed among the curved surface blades 4 is communicated with the water inlet of the straight tapered water outlet pipe 9, the water outlet of the straight tapered water outlet pipe 9 is communicated with the water inlet of the side water outlet box 10, the water outlets of the side water outlet box 10 are communicated with the water inlet of the circulating water pipe of the cooling tower, and the direct-connected low-speed small mixed flow type water turbine is characterized in that a bearing seat 6 is mounted on the runner 12, a shaft 7 is mounted in the bearing seat 6, and blades of a cooling fan are directly mounted on the shaft 7; and the value of unit rotational speed $$n_{11} = \frac{nD_1}{\sqrt{H}}$$

is 28-42, in the formula, n is the rated rotational speed of the blades of the cooling fan, D1 is the diameter of the water inlet of the runner 12, and H is the inlet water pressure.

The relationship between the height H1 of a flow passage part of the runner and the diameter of the water inlet of the runner 12 is as follows: H1/D1=0.35-0.42, the ratio of the diameter D2 of the water outlet of the runner 12 to the diameter D1 of the water inlet D2/D1=0.4-0.6, and the surface of the upper crown and the surface of the lower ring of the runner 12 are curved surfaces, wherein the average curvature of a bus for forming the surface of the upper crown is 1.6 rad/m-1.7 rad/m, and the average curvature of the bus for forming the surface of the lower ring is 4.8 rad/m-4.9 rad/m; and the number of the curved surface blades 4 in the runner 12 is 16-20, and the ratio of the minimal thickness to the maximal thickness of wing shapes of the curved surface blades is 0.28-0.34.

The guide vanes in the seat ring 2 are arranged into single column, which can not only play a diversion role, but also play a support role, the ratios of the diameter of an inner circle of each guide vane D4 and the diameter of an outer circle D3 to the diameter D1 of the water inlet of the runner 12, namely D4/D1 and D3/D1 are 1-1.1 and 1.15-1.25 respectively, the number of the guide vanes is 15-19, and the guide vanes adopt the wing shapes with negative curvature. The height H2 of the straight tapered water outlet pipe 9 is 0.2-0.5 times of the diameter D1 of the water inlet of the runner 12, and the diameter D5 of an outlet of the straight tapered water outlet pipe 9 is 0.45-0.75 times of the diameter D1 of the water inlet of the runner 12.

The height H3 of the side water outlet box 10 is 0.2-0.4 times of the diameter D1 of the water inlet of the runner 12, the side water outlet box 10 is provided with 4 water outlets in total, and the width B of each water outlet is 0.4-0.6 times of the diameter D1 of the water inlet of the runner 12.

The maximal size L1 in the left and right direction of the water turbine is 1.8-2.0 times of the diameter D1 of the water inlet of the runner 12, and the maximal size L2 in the front and back is 1.7-1.9 times of the diameter D1 of the water inlet of the runner 12.

A curve equation of the upstream face of the guide vanes, which directly affects the efficiency of the invention is as follows: $y = A_1 x^4 + B_1 x^3 + C_1 x^2 + D_1 x + E_1$, wherein $A_1 = -7 \times 10^{-8} \sim -9 \times 10^{-8}$, $B_1 = 3.5 \times 10^{-5} \sim 5.5 \times 10^{-5}$, $C_1 = -6.5 \times 10^{-5} \sim -8.5 \times 10^{-5}$, $D_1 = 2.2 \times 10^{-1} \sim 2.6 \times 10^{-1}$, and $E_1 = -9 \times 10^{-2} \sim -1.3 \times 10^{-1}$; and the curve equation of the downstream face is as follows: $y = A_2 x^4 + B_2 x^3 + C_2 x^2 + D_2 x + E_2$, wherein $A_2 = 1.9 \times 10^{-9} \sim 2.3 \times 10^{31\ 9}$, $B_2 = -1.7 \times 10^{-6} \sim -2.1 \times 10^{-6}$, $C_2 = -9.5 \times 10^{-4} \sim -1.0 \times 10^{-3}$, $D_2 = 2.5 \times 10^{-1} \sim 3.0 \times 10^{-1}$ and $E_2 = 3.1 \sim 3.7$, in the equations, the unit of x and y is mm, the upstream face and the downstream face of the head part of the guide vanes are in smooth connection, and the upstream face and the downstream face of the tail part of the guide vanes are in fold line connection.

The invention has the following benefits:

The control problem of the output rotational speed of the mixed flow type water turbine for the non-power generation type cooling tower is fundamentally solved through reasonable design and matching, the size and the shape of the guide vanes with the negative curvature in the seat ring can be finally determined and the size and the shape of the curved surface blades in the runner can be determined through the rated rotational speed which is required by the cooling fan, and the optimal size can be obtained through computer optimization so as to meet the requirement of driving force.

By adopting the invention, the speed reduction box can be eliminated, the noise of the whole machine can be greatly reduced, the manufacturing and the maintenance cost can be reduced, the fault-free working time can be greatly prolonged, and the overall efficiency can be kept above 86%.

The invention breaks through the range of use of the unit rotational speed in the design of the traditional water turbine, the value of the unit rotational speed is reduced from above the traditional 80 to 28-42, namely the value $$n_{11} = \frac{n D_1}{\sqrt{H}}$$

is 28-42, wherein, $n_{11}$ is the unit rotational speed, n is the actual rotational speed of the fan (r/min), D1 is the diameter (m) of a water inlet edge of the runner, and H is the inlet water pressure (water column is taken as unit: m). The invention is not only applicable to characteristics of the water turbine of the cooling tower, but also conductive to reducing the overall size and improving the efficiency.

DETAILED DESCRIPTION OF THE INVENTION

Figure 1:
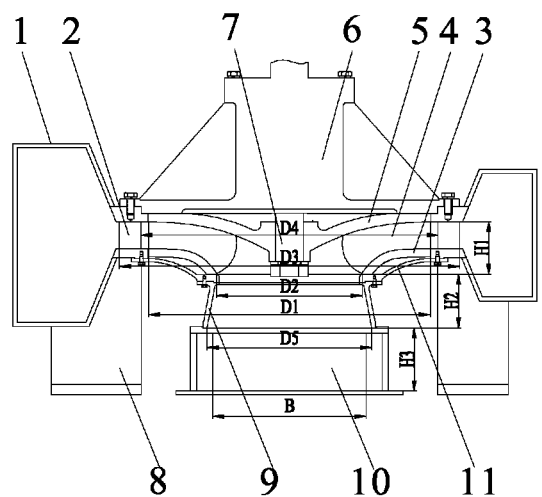
FIG. 1 is a front view schematic diagram of overall structure of scroll case when cross section is in the shape of multiple metal trapezoids.
Figure 2:
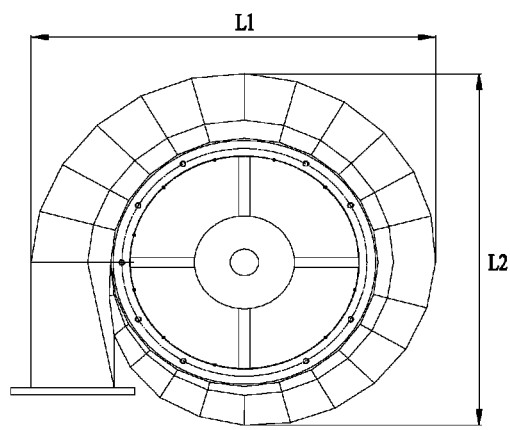
FIG. 2 is an overhead view schematic diagram of FIG. 1.

In combination of the figures and the embodiment, the invention is further described as follows. As shown in FIGS. 1-5, a direct-connected low-speed small mixed flow type water turbine applied in a hydrodynamic energy-saving cooling tower comprises a metal scroll case 1 with the oval (FIG. 3) or trapezoidal (FIG. 1) water inlet cross section, a seat ring 2 provided with single column of guide vanes annularly, a runner 12 of the low-rotational speed mixed flow type water turbine, which comprises a lower ring 3, curved surface blades 4 and an upper crown 5, a straight tapered water outlet pipe 9 and a side water outlet box 10, wherein the seat ring 2 is mounted on the inner side of the scroll case 1, the scroll case 1 is supported on a rest pier 8, and a confluence disc 11 is mounted at the lower part of the runner 12; as shown in FIG. 1, a water inlet among the guide vanes in the seat ring 2 is communicated with a water outlet channel of the scroll case 1, the water inlet of the scroll case 1 is communicated with a water outlet of a circulating water pipe of the cooling tower, a water outlet among the guide vanes in the seat ring 2 is communicated with the water inlet formed among the curved surface blades 4 in the middle of the runner 12, the water outlet formed among the curved surface blades 4 is communicated with the water inlet of the straight tapered water outlet pipe 9, the water outlet of the straight tapered water outlet pipe 9 is communicated with the water inlet of the side water outlet box 10, the water outlets of the side water outlet box 10 are communicated with the water inlet of the circulating water pipe of the cooling tower, a bearing seat 6 is mounted on the runner, a shaft is mounted in the bearing seat 6, and blades of a cooling fan are directly mounted on the shaft 7 (not shown in the figure). The value of the unit rotational speed of the whole machine $$n_{11} = \frac{n D_1}{\sqrt{H}}$$

is 28-42 (in the formula, n is the rated rotational speed of the blades of the cooling fan, D1 is the diameter of the water inlet of the runner 12, H is the inlet water pressure, and the unit is the height of water column, m), from the formula, we can know that, as long as the rotational speed n of the fan and the pressure H of the small head are determined (the two parameters are determined by design parameters of the cooling tower), the exclusive diameter D1 of the water inlet of the runner can be determined, and the sizes of all the parts (including the runner, the blades, the seat ring, the guide vanes, the maximal length and the maximal width) of the whole water turbine can be exclusively determined.

Figure 3:
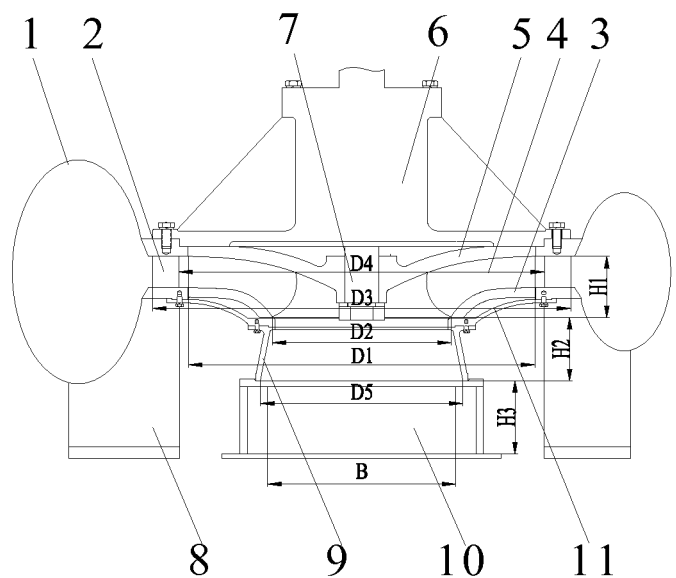
FIG. 3 is a front view schematic diagram of overall structure of scroll case when cross section is in the shape of multiple metal ovals.
Figure 4:
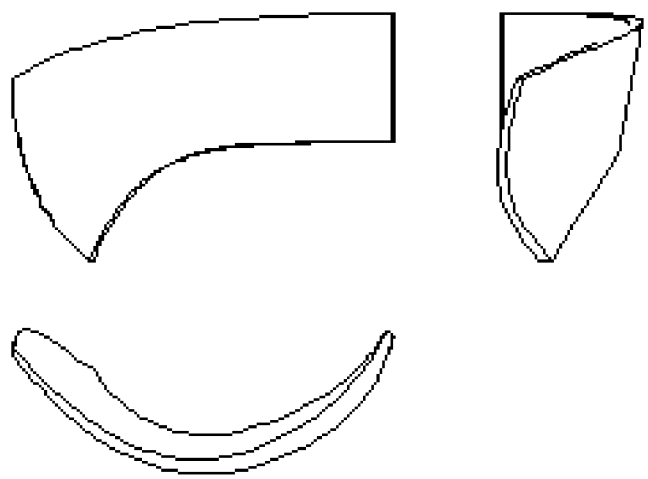
FIG. 4 is a three-view schematic diagram of blade of runner of the invention.
Figure 5:
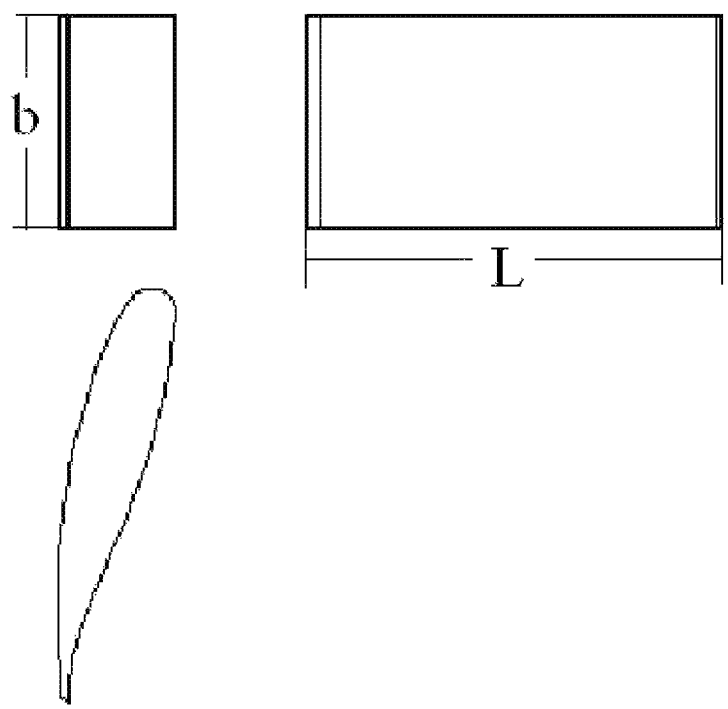
FIG. 5 is a three-view schematic diagram of wing shape of guide vane with negative curvature of the invention.

For example, H1/D1=0.35-0.42, wherein H1 is the height of a flow passage part of the runner 12, the ratio of the diameter of the water outlet of the runner 12 to the diameter of the water inlet D2/D1=0.4-0.6, and the surface of the upper crown and the surface of the lower ring of the runner 12 are curved surfaces, wherein the average curvature of a bus for forming the surface of the upper crown is 1.6 rad/m-1.7 rad/m, and the average curvature of the bus for forming the surface of the lower ring is 4.8 rad/m-4.9 rad/m; and the number of the curved surface blades 4 in the runner 12 is 16-20, and the ratio of the minimal thickness to the maximal thickness of wing shapes of the curved surface blades is 0.28-0.34, as shown in FIG. 4. The guide vanes in the seat ring 2 are arranged into single column, which can not only play a diversion role, but also play a support role, the ratios of the diameter of an inner circle of each guide vane and the diameter of an outer circle to the normal diameter of the inlet of the runner, namely D4/D1 and D3/D1 are 1-1.1 and 1.15-1.25 respectively, the number of the guide vanes is 15-19, and the guide vanes adopt the wing shapes with negative curvature. FIG. 5 is a three-view projection drawing of one guide vane in the wing shape with the negative curvature. The height H2 of the straight tapered water outlet pipe 9 is 0.2-0.5 times of the diameter D1 of the water inlet of the runner 2, and the diameter D5 of an outlet of the straight tapered water outlet pipe 9 is 0.45-0.75 times of the diameter D1 of the water inlet of the runner 12, as shown in FIG. 1 and FIG. 3.

The height H3 of the side water outlet box 10 is 0.2-0.4 times of the diameter D1 of the water inlet of the runner 12, the side water outlet box 10 is provided with 4 water outlets in total, and the width B of each water outlet is 0.4-0.6 times of the diameter D1 of the water inlet of the runner 12, as shown in FIG. 1 and FIG. 3. The maximal size L1 in the left and right direction of the water turbine is 1.8-2.0 times of the diameter D1 of the water inlet of the runner, and the maximal size L2 in the front and back is 1.7-1.9 times of the diameter D1 of the water inlet of the runner. A curve equation of the upstream face of the guide vanes, which directly affects the efficiency of the water turbine is as follows: $y=A_1x^4+B_1x^3+C_1x^2+D_1x+E_1$, wherein $A_1=-7\times10^{-8} \sim -9\times10^{-8}$, $B_1=3.5\times10^{-5} \sim 5.5\times10^{-5}$, $C_1=-6.5\times10^{-5} \sim -8.5\times10^{-5}$, $D_1=2.2\times10^{-1} \sim 2.6\times10^{-1}$, and $E_1=-9\times10^{31}$ $^2 \sim -1.3\times10^{-1}$; and the curve equation of the downstream face is as follows: $y=A_2x^4+B_2x^3+C_2x^2+D_2x+E_2$, wherein $A_2=1.9\times10^{-9} \sim 2.3\times10^{-9}$, $B_2=-1.7\times10^{-6} \sim -2.1\times10^{-6}$, $C_2=-9.5\times10^{-4} \sim -1.0\times10^{-3}$, $D_2=2.5\times10^{-1} \sim 3.0\times10^{-1}$ and $E_2=3.1\times3.7$, in the equations, the unit of x and y is mm, the upstream face and the downstream face of the head part of the guide vanes are in smooth connection, and the upstream face and the downstream face of the tail part of the guide vanes are in fold line connection.

From the foregoing, those skilled in the art can design the water turbine which is in line with the requirements very conveniently according to the formula provided by the invention. Experimental data show that, as long as the value of the unit rotational speed $n_{11}$ is 28-42, the efficiency of the water turbine of the invention can be kept at about 86%, when the value of the $n_{11}$ is less than 28, the actually measured rotational speed is obviously lower than the rated rotational speed by above 30%, and the efficiency must be improved by above 90% in comparison with the original basis for improving the rotational speed by ⅓, when the unit rotational speed $n_{11}$ is more than 42, not only the overall size is increased, but also the same situation occurs in the actually measured output rotational speed, so that the optimal value range of the unit rotational speed $n_{11}$ is 28-42.

The main working process of the invention is as follows:

Water with certain pressure and flow rate forms a certain circulation through the scroll case for entering into the seat ring, thereby generating impact on the runner of the water turbine through the roles of diversion and acceleration of the guide vanes, driving the runner to rotate, enabling the runner to drive the shaft 7 to rotate, enabling the shaft 7 to drive the blades of the fan at the upper end to rotate and completing the conversion from water energy to mechanical energy; and the water out of the runner is finally discharged from the side water outlet box and enters into an air-conditioning system for circulation.

The non-involved parts are the same with the prior art or can be realized by adopting the prior art.

What is claimed is:

1. A direct-connected low-speed small mixed flow type water turbine applied in a hydrodynamic energy-saving cooling tower, comprising:

A water inlet scroll case (1);

A seat ring (2) provided with single column of guide vanes annularly;

A runner (12) of the low-rotational speed mixed flow type water turbine, which comprises a lower ring (3), curved surface blades (4) and an upper crown (5);

A straight tapered water outlet pipe (9) and a side water outlet box (10);

The seat ring (2) is mounted on the inner side of the scroll case (1), a water inlet among the guide vanes in the seat ring (2) is communicated with a water outlet channel of the scroll case (1), the water inlet of the scroll case (1) is communicated with a water outlet of a circulating water pipe of the cooling tower, the water outlet among the guide vanes in the seat ring (2) is communicated with the water inlet formed among the curved surface blades (4) in the middle of the runner, the water outlet formed among the curved surface blades (4) is communicated with the water inlet of the straight tapered water outlet pipe (9), the water outlet of the straight tapered water outlet pipe (9) is communicated with the water inlet of the side water outlet box (10), the water outlets of the side water outlet box (10) are communicated with the water inlet of the circulating water pipe of the cooling tower, and the direct-connected low-speed small mixed flow type water turbine is characterized in that a bearing seat (6) is mounted on the runner (12), a shaft (7) is mounted in the bearing seat (6), and blades of a cooling fan are directly mounted on the shaft (7); and the value of unit rotational speed $$n_{11} = \frac{nD_1}{\sqrt{H}}$$

is 28-42, in the formula, n is the rated rotational speed of the blades of the cooling fan, D1 is the diameter of the water inlet of the runner (12), and H is the inlet water pressure.

2. The water turbine according to claim 1, characterized in that the relationship between the height H1 of a flow passage part of the runner and the diameter of the water inlet of the runner (12) is as follows: H1/D1=0.35-0.42, the ratio of the diameter D2 of the water outlet of the runner (12) to the diameter D1 of the water inlet D2/D1=0.4-0.6, and the surface of the upper crown and the surface of the lower ring of the runner (12) are curved surfaces, wherein the average curvature of a bus for forming the surface of the upper crown is 1.6 rad/m-1.7 rad/m, and the average curvature of the bus for forming the surface of the lower ring is 4.8 rad/m-4.9 rad/m; and the number of the curved surface blades (4) in the runner (12) is 16-20, and the ratio of the minimal thickness to the maximal thickness of wing shapes of the curved surface blades is 0.28-0.34.

3. The water turbine according to claim 1, characterized in that the guide vanes in the seat ring (2) are arranged into single column, which can not only play a diversion role, but also play a support role, the ratios of the diameter of an inner circle of each guide vane D4 and the diameter of an outer circle D3 to the diameter D1 of the water inlet of the runner (12), namely D4/D1 and D3/D1 are 1-1.1 and 1.15-1.25 respectively, the number of the guide vanes is 15-19, and the guide vanes adopt the wing shapes with negative curvature.

4. The water turbine according to claim 1, characterized in that the height H2 of the straight tapered water outlet pipe (9) is 0.2-0.5 times of the diameter D1 of the water inlet of the runner (12), and the diameter D5 of an outlet of the straight tapered water outlet pipe (9) is 0.45-0.75 times of the diameter D1 of the water inlet of the runner (12).

5. The water turbine according to claim 1, characterized in that the height H3 of the side water outlet box (10) is 0.2-0.4 times of the diameter D1 of the water inlet of the runner (12), the side water outlet box (10) is provided with 4 water outlets in total, and the width B of each water outlet is 0.4-0.6 times of the diameter D1 of the water inlet of the runner (12).

6. The water turbine according to claim 1, characterized in that the maximal size L1 in the left and right direction of the water turbine is 1.8-2.0 times of the diameter D1 of the water inlet of the runner (12), and the maximal size L2 in the front and back is 1.7-1.9 times of the diameter D1 of the water inlet of the runner (12).

7. The water turbine according to claim 1, characterized in that a curve equation of the upstream face of the guide vanes, which directly affects the efficiency of the water turbine is as follows: $y=A_1x^4+B_1x^3+C_1x^2+D_1x+E_1$, wherein $A_1=-7\times 10^{-8} \sim -9\times 10^{-8}$, $B_1=3.5\times 10^{-5} \sim 5.5\times 10^{-5}$, $C_1=-6.5\times 10^{-5} \sim -8.5\times 10^{-5}$, $D_1=2.2\times 10^{-1} \sim 2.6\times 10^{-1}$, and $E_1=-9\times 10^{-2} \sim -1.3\times 10^{-1}$; and the curve equation of the downstream face is as follows: $y=A_2x^4+B_2x^3+C_2x^2+D_2x+E_2$, wherein $A_2=1.9\times 10^{-9} \sim 2.3\times 10^{-9}$, $B_2=-1.7\times 10^{-6} \sim -2.1\times 10^{-6}$, $C_2=-9.5\times 10^{-4} \sim -1.0\times 10^{-3}$, $D_2=2.5\times 10^{-1} \sim 3.0\times 10^{-1}$ and $E_2=3.1 \sim 3.7$, in the equations, the unit of x and y is mm, the upstream face and the downstream face of the head part of the guide vanes are in smooth connection, and the upstream face and the downstream face of the tail part of the guide vanes are in fold line connection.

* * * * *